(12) United States Patent
Heldberg (10) Patent No.: US 7,258,483 B2
(45) Date of Patent: Aug. 21, 2007

(54) DEVICE FOR MEASURING THE LEVEL AND/OR THE TEMPERATURE IN A CONTAINER

(75) Inventor: Carsten Heldberg, Kirchlinteln (DE)

(73) Assignee: ITW Automotive Products GmbH & Co. KG, Iserlohn (DE)

( * ) Notice: Subject to any disclaimer, the term of this patent is extended or adjusted under 35 U.S.C. 154(b) by 24 days.

(21) Appl. No.: 11/129,302

(22) Filed: May 16, 2005

(65) Prior Publication Data

US 2005/0265425 A1 Dec. 1, 2005

(30) Foreign Application Priority Data

May 29, 2004 (DE) ...................... 10 2004 026 396

(51) Int. Cl.
*G01K 7/16* (2006.01)
*G01F 23/24* (2006.01)

(52) U.S. Cl. ...................... 374/110; 374/141; 374/185; 374/45; 73/292; 73/295

(58) Field of Classification Search ................ 374/185, 374/183, 115, 110, 111, 112, 113, 114, 30, 374/137, 136, 45; 338/22 R, 28
See application file for complete search history.

(56) References Cited

U.S. PATENT DOCUMENTS

| | | | | | |
|---|---|---|---|---|---|
| 2,625,043 | A | * | 1/1953 | Tapp et al. .................. | 374/116 |
| 2,753,513 | A | * | 7/1956 | Sola .......................... | 323/307 |
| 2,753,713 | A | * | 7/1956 | Mabey ....................... | 374/115 |
| 3,015,954 | A | * | 1/1962 | Dalglish ..................... | 374/116 |
| 3,038,097 | A | * | 6/1962 | De Graffenried ........... | 313/509 |
| 3,267,730 | A | * | 8/1966 | Satterthwaite et al. ....... | 73/295 |
| 3,357,248 | A | * | 12/1967 | Tyson ......................... | 374/115 |
| 3,469,447 | A | * | 9/1969 | Becker ....................... | 374/116 |
| 3,703,693 | A | * | 11/1972 | Levinn ........................ | 337/1 |
| 3,813,941 | A | * | 6/1974 | Miguel et al. ................ | 73/313 |
| 4,313,084 | A | * | 1/1982 | Hosokawa et al. .......... | 323/370 |
| 4,362,403 | A | * | 12/1982 | Mooney ....................... | 374/4 |
| 4,420,974 | A | * | 12/1983 | Lord ........................... | 73/152.13 |
| 4,449,404 | A | | 5/1984 | Bohme et al. | |
| 4,500,865 | A | * | 2/1985 | Tanaka et al. ................ | 338/13 |
| 4,563,098 | A | * | 1/1986 | Bartran ....................... | 374/172 |
| 4,591,839 | A | * | 5/1986 | Charboneau et al. ....... | 340/620 |

(Continued)

FOREIGN PATENT DOCUMENTS

DE 31 25 633 A1 1/1983

(Continued)

*Primary Examiner*—Gail Verbitsky (57) ABSTRACT

A device for measuring at least one of a level and a temperature of a liquid in a container includes a resistor arrangement adapted to be immersed in the liquid. An immersed length of the resistor arrangement in the liquid corresponds to the level of the liquid in the container. The resistor arrangement includes upper, middle and lower temperature-dependent elongated resistor elements connected in series or in parallel. Each resistor element has an uniform resistance per unit length along a length thereof. The upper and lower resistor elements are shorter than the middle resistor element. A power source is connectable to the resistor arrangement. Voltage drops across or currents flowing through the resistor elements are measured. A microprocessor is arranged to calculate the immersed length of the resistor arrangement or the temperature of the liquid from predetermined lengths of the resistor elements and from the measured voltages or currents.

10 Claims, 8 Drawing Sheets

U.S. PATENT DOCUMENTS

| | | | |
|---|---|---|---|
| 4,618,268 A * | 10/1986 | Horner | 374/115 |
| 4,679,432 A * | 7/1987 | Draeger | 73/295 |
| 4,816,748 A * | 3/1989 | Tazawa et al. | 324/694 |
| 4,840,494 A * | 6/1989 | Horn | 374/1 |
| 4,852,054 A * | 7/1989 | Mastandrea | 702/51 |
| 4,969,749 A * | 11/1990 | Hasselmann | 374/115 |
| 5,037,488 A * | 8/1991 | Wienand | 136/230 |
| 5,197,329 A | 3/1993 | Grundy | |
| 5,253,521 A * | 10/1993 | Abramovich et al. | 73/306 |
| 5,279,161 A * | 1/1994 | Glassey et al. | 73/708 |
| 5,330,268 A * | 7/1994 | Klein et al. | 374/54 |
| 5,421,202 A * | 6/1995 | Le Pimpec | 73/295 |
| 6,431,750 B1 * | 8/2002 | Haberbusch et al. | 374/166 |
| 6,433,560 B1 * | 8/2002 | Hansen et al. | 324/668 |
| 6,615,658 B2 * | 9/2003 | Snelling | 73/295 |
| 6,634,229 B1 * | 10/2003 | Kazkaz et al. | 73/304 R |
| 6,776,037 B2 * | 8/2004 | Maatuk | 73/295 |
| 6,948,364 B2 * | 9/2005 | Snelling et al. | 73/295 |
| 6,973,828 B2 * | 12/2005 | Zimmermann et al. | 73/295 |
| 6,990,861 B2 * | 1/2006 | Ham | 73/295 |
| 7,004,625 B2 * | 2/2006 | Egidio | 374/166 |
| 2002/0182119 A1 * | 12/2002 | Daily et al. | 422/119 |
| 2003/0035462 A1 * | 2/2003 | Savoie | 374/141 |
| 2006/0042375 A1 * | 3/2006 | Davis | 73/295 |

FOREIGN PATENT DOCUMENTS

| | | |
|---|---|---|
| DE | 31 34 912 | 5/1984 |
| DE | 31 53 284 | 1/1987 |
| DE | 38 24 663 A1 | 1/1989 |
| DE | 31 48 383 | 11/1989 |
| DE | 33 41 630 | 11/1991 |
| DE | 43 27 521 | 2/1995 |
| DE | 198 49 706 | 5/2000 |
| SU | 540149 | 7/1977 |

* cited by examiner

DEVICE FOR MEASURING THE LEVEL AND/OR THE TEMPERATURE IN A CONTAINER

RELATED APPLICATIONS

The present application is based on, and claims priority from, German Application Number 10 2004 026 396.5, filed May 29, 2004, the disclosure of which is hereby incorporated by reference herein in its entirety.

FIELD OF THE INVENTION

The present invention is related to a device for measuring the level and/or the temperature of a liquid in a container.

BACKGROUND OF THE INVENTION

Many different methods for the determination of the level of a liquid in a container have become known. For instance, it is known to detect a float element in its position in different ways. For instance, the detection takes place mechanically, electrically or the like. Further, it is known to determine the level of the liquid in the container via reflection measurement, with electromagnetic or sound waves, e.g. Most methods are either intricate and/or not particularly significant. Also, there is the danger that they break down or become inaccurate after a certain period of time.

SUMMARY OF THE INVENTION

The present invention is based on the objective to provide a device for measuring the level of a liquid in a container, which can be installed by simple means and which operates securely during an indefinite period of time. Furthermore, the measurement of temperature in the container or in the liquid, respectively, is also to be made possible.

In accordance with an aspect of the invention, a linear resistor arrangement of three serially connected resistor portions is provided, each of which has at least one temperature depending elongated resistor element with an uniform resistance per unit length about its length. The series arrangement is immersed approximately vertically into the liquid. The resistor portions or resistor elements, respectively, have a predetermined length, with the upper and lower resistor portion being relatively short in relation to the intermediate portion. The short resistor portions serve as a reference and the longer one serves as the measuring portion. The series arrangement is connected to a voltage source, and a voltage meter measures the voltages of the resistor portions. A computer calculates the immersed length of the resistor arrangement or the temperature of the liquid, respectively, from the length dimensions of the resistor portions and the resistor elements and from the measured voltages by means of known resistor formulae.

In accordance with a further aspect of the invention, three resistor portions are also linearly arranged and can be vertically immersed into a liquid, however, the resistor portions are parallel connected. Again, the resistor portions have a predetermined length, with the upper and lower resistor portions serving as a reference being relatively short in relation to the intermediate resistor portion. A current measuring device measures the currents flowing through the resistor portions and a computer calculates the length of the resistor arrangement immersed into the liquid or the temperature of the liquid, respectively, from the length dimensions of the resistor portions and the measured currents by means of known resistance formulae.

In an embodiment of the invention, the resistor arrangements are selected such that by passing current through, an increase of the temperature of the dry region of several 110C results, for instance. On that region where the resistor is immersed into the liquid, a significantly lower temperature will be established, because the heat is dissipated much better by the liquid. It is advantageous that the material of the resistor have a temperature coefficient which is as pronounced as possible, in this being irrelevant, however, whether it is positive (PTC-behaviour) or negative (NTC-behaviour).

As the length of the resistor portions or resistor elements, respectively, is known and the occurring voltages or currents can be measured, it is possible to determine the immersed length of the resistor arrangement with the aid of the known resistor formulae.

With the aid of the resistor arrangement according to embodiments of the invention, it is possible to perform a temperature measurement, for which purpose the temperature dependence of the resistors is taken in consideration. The resistance is measured with the aid of the shorter resistor portion, which serves as a reference, by a very small measuring current, which still does not provoke any intrinsic heating by itself. The characteristic curve of the resistor portions is known or can be determined on the manufacture, respectively. Even when this characteristic curve is strongly non-linear, the actual temperature can be determined by looking up in a cross-reference list. Such a cross-reference list can be laid down in the memory of a micro-controller, which also performs the measurements and interpretations.

As mentioned already, the upper and the lower resistor portions serve as a reference. Each resistor portion may be constituted by a plurality of resistor elements, which are each commensurate and have a resistance per unit length which is uniform about their length. The resistor elements are connected either in series or parallel. The all have the same distance from each other.

In the device according to an aspect of the invention, it is not required that separate resistor elements are employed, rather a continuous resistor element, a wire or a resistor path for instance, may be employed, which is subdivided by taps into individual resistor elements or resistor portions, respectively. When the liquids are electrically conductive, the wire or the resistor path has to be coated with a suitable insulating layer. The use of a resistor coil is also particularly advantageous, as the conductor length is significantly increased through this.

According to a further embodiment of the invention, a particularly preferred arrangement is that the resistor arrangement is provided as a printed resistor path, by screen printing for instance, which resistor path is e.g. applied onto a substrate material which is flexible, if need should be. The connections may also be applied as printed conductor paths (conductive silver or the like) or as etched copper paths. The whole arrangement can be covered by a thin insulating sheet. Such implementations are already used in connection with electric heating sheets in automobiles, for instance.

According to another embodiment of the invention, a plurality of resistor arrangements of temperature depending resistors can be disposed in the container. This is particularly meaningful in containers, such as automobile tanks, when these are not planar on the bottom thereof, but have an arbitrary contour, a saddle contour e.g., and the content of the liquid is not more apt to be determined good enough by one single sensor only.

With the aid of the device according to embodiment of the invention, the inclination of the liquid level may also be determined, with spaced resistor series arrangements each being arranged on two orthogonal axes according to one form of realisation of the invention.

BRIEF DESCRIPTION OF THE DRAWING

The embodiments of the invention will be explained in more detail by means of drawings below.

DETAILED DESCRIPTION OF THE INVENTION

Figures 1, 2, 3:
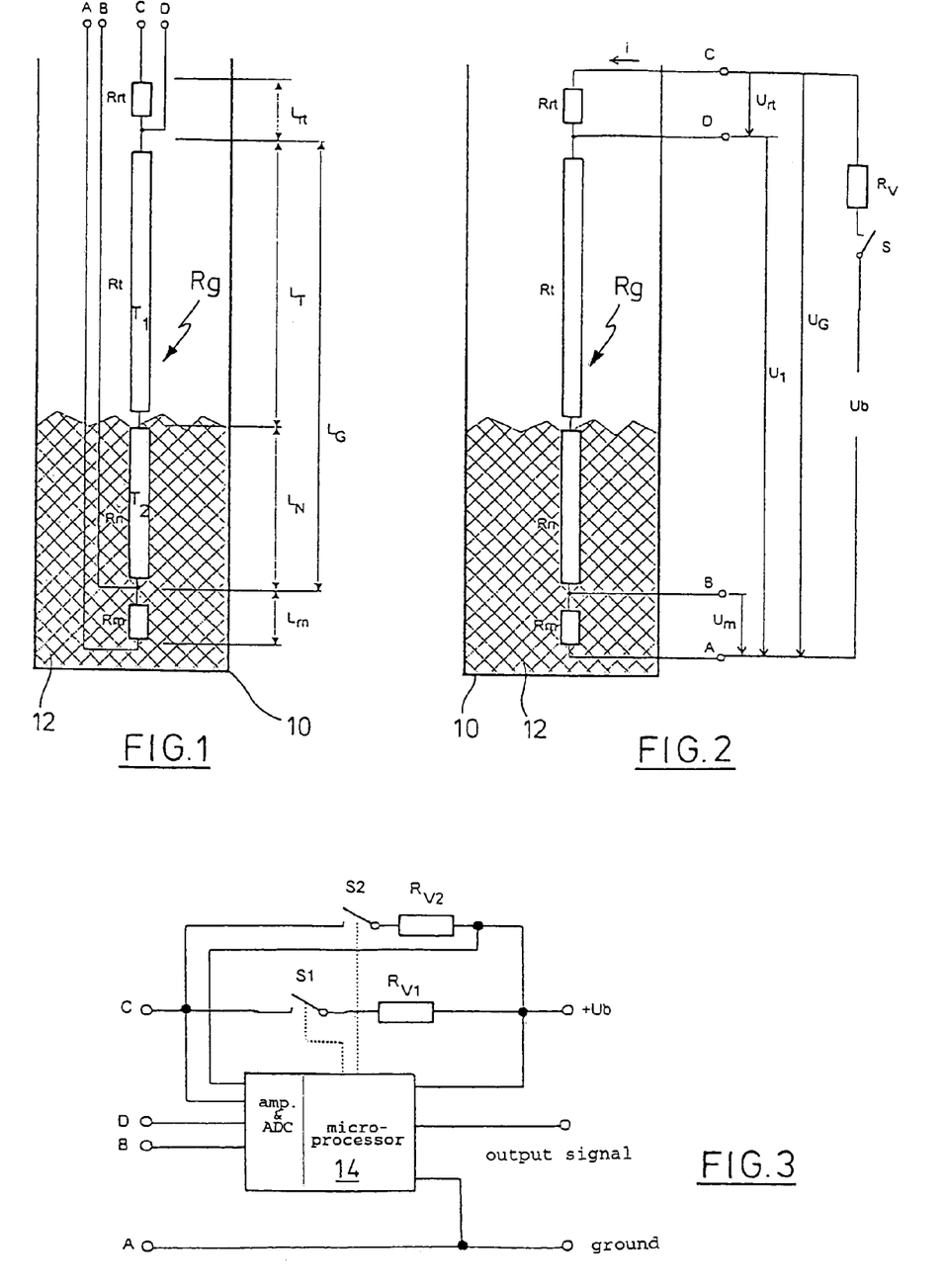
FIG. 1 schematically shows the device according to an embodiment of the invention in the form of an equivalent electric circuit diagram.
FIG. 2 shows the arrangement of FIG. 1 with the measured voltages.
FIG. 3 shows a circuitry arrangement for measurement with the device according to FIGS. 1 and 2.

In FIGS. 1 and 2, a container 10 is represented, which is partially filled with a liquid 12. In the container 10, there is arranged a resistor arrangement of resistors $R_{rt}$, $R_{rn}$ and $R_G$. The mentioned resistors have a predetermined length of $L_{rt}$, $L_{rn}$ and $L_G$, respectively. As is recognisable, the length of the resistors $R_{rt}$ and $R_{rn}$ is significantly shorter than that of resistor $R_G$. The mentioned resistors have a predetermined length and a predetermined resistance per unit length and are furthermore temperature-depending. When a current flows through the resistor arrangement which results in a certain intrinsic heating, that part of the resistor arrangement which is situated in the dry region has the temperature T1. The other part of the resistor arrangement ($R_{rn}$ and $R_n$), which is situated in the wet region, has the temperature T2. When a current is applied for measurement which does not yet result in any observable intrinsic heating, the intrinsic temperature of the reference resistors $R_{rt}$ and $R_{rn}$ may be determined. These temperatures are then the sought ones of the liquid 12 and the ambient air, respectively. The current used for this purpose is very small, for the sake that its does not yet provoke any intrinsic heating. The characteristic curve of the mentioned resistors (resistance vs. temperature) is known or can be determined upon the manufacture, respectively. Even when this characteristic curve is very strongly nonlinear, the actual temperature can be determined by looking it up in a cross-reference list. The cross-reference list is laid down in the memory of a microprocessor, which can be made involved in the measurement, to which will be incurred below.

The resistor arrangement according to FIGS. 1 and 2 has a temperature-dependent resistivity (resistance per unit length) of $W_T$ for the temperature T1 and $W_N$ for the temperature T2. Thus, the following resistances result:

| Reference resistor "dry" | $R_{rt} = L_{rt} \cdot W_T$ |
| Reference resistor "wet" | $R_{rn} = L_{rn} \cdot W_N$ |
| Measuring resistor "dry" | $R_T = L_T \cdot W_T$ |
| Measuring resistor "wet" | $R_N = L_N \cdot W_N$ |

The lengths of the reference resistors are constant and known, and thus may later easily be taken into account in an additive manner. The lengths of the measuring resistors obey the relation $$L_G = L_T + L_N \tag{5},$$

after rearrangement we have then $$L_T = L_G - L_N \tag{6}$$

The resistance of the measuring portion $L_G$ is then the series connection of the resistance parts "dry" path and "wet" path:

$$R_G = R_T + R_N \tag{7}$$

With the material parameters "lengths of the resistor paths" and the respective valid "resistivities (resistances per unit length)" for the "dry" part and the "wet" part, respectively, we have $$R_G = L_T \cdot W_T + L_N \cdot W_N \tag{8}$$

Substituting now (6) in (8), we obtain $$R_G = L_G \cdot W_T - L_N \cdot W_T + L_N \cdot W_N \tag{9}$$

After resolving equation (9) into $L_N$ we obtain $$L_N = \frac{R_G - L_G \cdot W_T}{W_N - W_T} \tag{10}$$

The actual resistivity for the "dry" part and the other resistivity for the "wet" part of the resistor path can be easily determined, because the lengths of the reference resistors are constant and are known.

$$W_T = \frac{R_{rt}}{L_{rt}} \tag{11}$$

$$W_N = \frac{R_{rn}}{L_{rn}} \tag{12}$$

Selecting the lengths $L_{rn}$ and $L_{rt}$ to be equal and substituting them into equation (10) results $$L_N = \frac{(R_G - R_{rt}) \cdot \frac{L_G}{L_{rt}}}{\frac{R_m}{L_m} - \frac{R_{rt}}{L_{rt}}} \quad (13)$$

Equation (13) can then be simplified to $$L_N = \frac{L_{rt} \cdot R_G - L_G \cdot R_{rt}}{R_m - R_{rt}} \quad (14)$$

Taking into consideration that in the series connection of the resistors, all the resistors are traversed by the same current i and that the resistors can be described by $$R_G = \frac{U_G}{i}; \quad (15)$$

$$R_{rt} = \frac{U_{rt}}{i}; \quad (16)$$

$$R_m = \frac{U_m}{i} \quad (17)$$

we obtain $$L_{rt} = \frac{L_{rt} \cdot \frac{U_G}{i} - L_G \cdot \frac{U_{rt}}{i}}{\frac{U_m}{i} - \frac{U_{rt}}{i}} \quad (18)$$

The current i takes itself out and equation (18) is simplified to $$L_N = \frac{L_{rt} \cdot U_G - L_G \cdot U_{rt}}{U_m - U_{rt}} \quad (19)$$

Now we have found an equation for the sought length $L_N$, which depends only from the easily measurable voltages and the known magnitudes $L_{rt}$ and $L_G$.

The voltage $U_{rt}$ can be determined according to $$U_{rt} = U_G - U_l \quad (20)$$

Through this, all the voltages are referred to one potential and can be easily measured.

The sought level height is the sum of the length $L_N$ and the length of the reference resistor $L_m$.

In FIG. 3, a measuring circuit for the determination of the Temperatures T1 and T2 as well as of the level height $L = L_m + L_N$ is shown. It includes a microprocessor 14, which contains a measuring amplifier and an analog/digital-converter (ADC). The connections a, b, c correspond to the connections or taps, respectively, of the resistor arrangement according to FIG. 2. By selective actuation of the switches S 1, S 2, the modes of operation "temperature measurement" and "level height measurement" can be selected. The microprocessor 14 performs the calculations indicated above in order to determine the level height or the temperatures, respectively.

Figure 4:
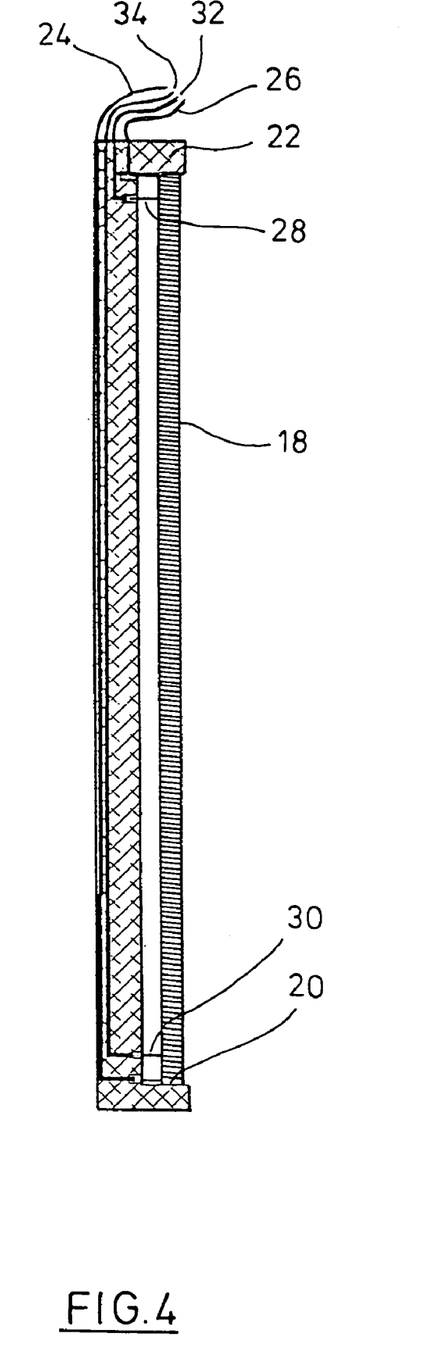
FIG. 4 shows a particular embodiment of the invention.
Figure 5:
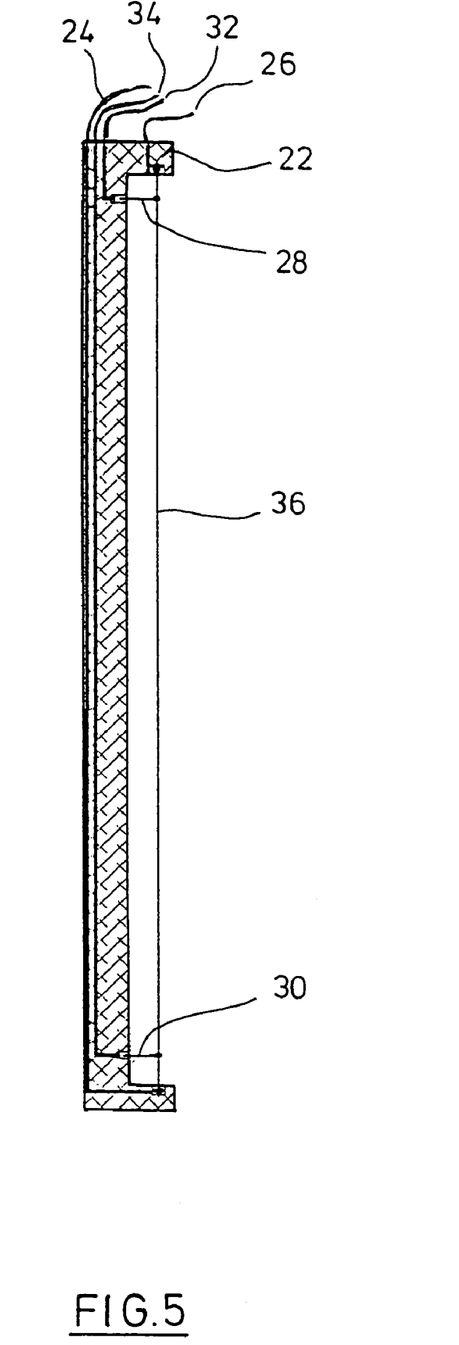
FIG. 5 shows another embodiment of the invention.

FIG. 5 shows an example of realisation for the resistor arrangement according to FIGS. 1 and 2. In FIG. 4, a coil 18 of a suitable, preferably insulated (enamelled) resistor wire is wound on an insulating spike 20. The spike is held by an insulating mounting 22. A first conductor 24 is connected to the lower end, and a second conductor 26 to the upper end of the resistor coil. The conductors 24, 26 can be connected to a suitable voltage source. The resistor coil 18 has an upper tap 28 and a lower tap 30, which are connected to conductors 32, 34. The conductors 24, 26, 32, 34 are guided within the insulating mounting 22. With the aid of the taps 28, 30, the resistors $R_T$, $R_G$ and $R_m$ represented in the equivalent circuit diagram of FIG. 1 are recreated.

In FIG. 5, only a thin copper wire 36, which is equipped with an enamel insulation, is clamped in the mounting 22. The remaining features correspond to those of FIG. 4, so that equal reference numerals are used also. It is to be understood that the resistor length of the coil 18 is many times larger than the length of the resistor wire 36, so that the measuring device according to FIG. 4 is significantly more sensitive than that according to FIG. 5.

Figure 6:
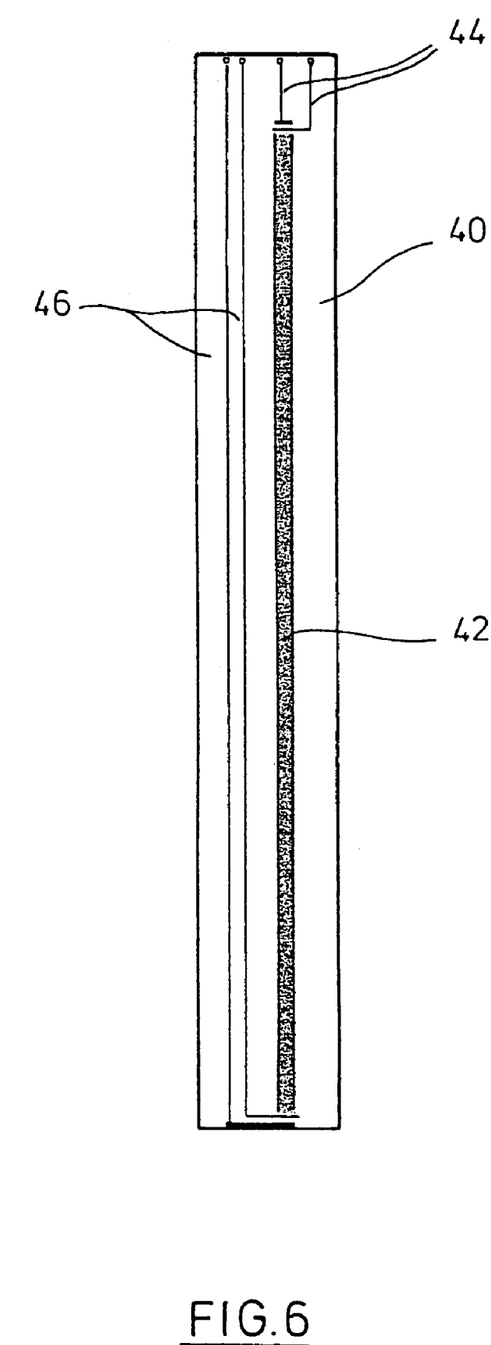
FIG. 6 shows a third embodiment of the invention as a printed sheet.
Figure 7:
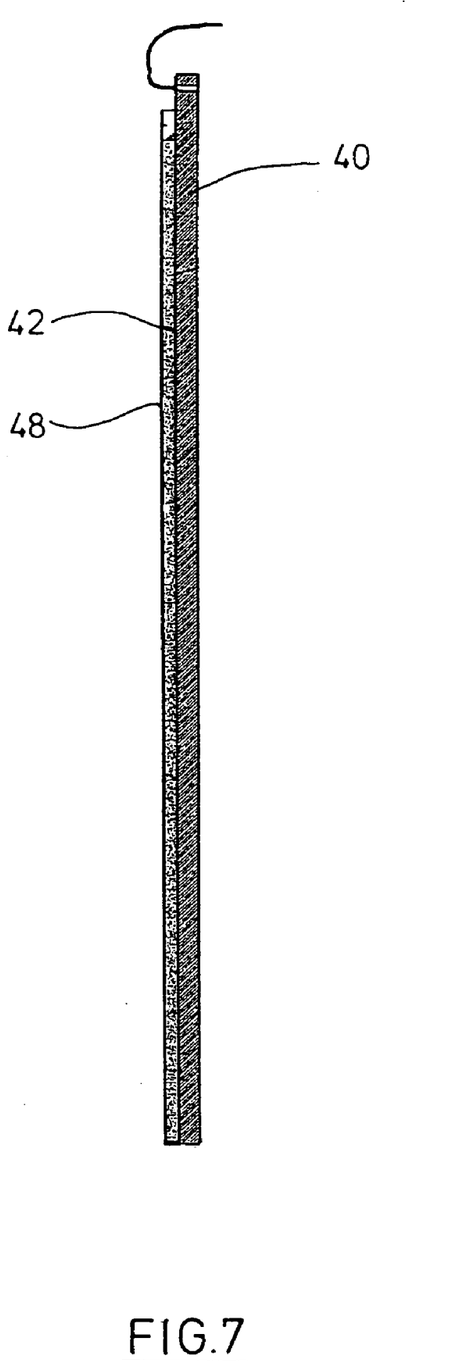
FIG. 7 shows a cross-section through the arrangement according to FIG. 6.

In FIGS. 6 and 7, a further example of realisation for a resistor measurement arrangement is represented. A resistor path 42 is printed on a flexible support sheet 40 with pronounced NTC- or PTC characteristics, by the screen printing method for instance. Furthermore, conductor paths 44 and 46, respectively, are applied as etched or printed paths, for instance. The whole arrangement is covered by an insulating sheet 48. The wiring of the resistor arrangement according to FIGS. 6 and 7 corresponds to that one according to FIGS. 4 and 5, so that it is not necessary to explain it in detail again. One recognises that the upper and lower reference resistors of the printed resistor path 42 are very short in relation to the length of the resistor path therebetween (see also FIGS. 1 and 2).

Figure 8:
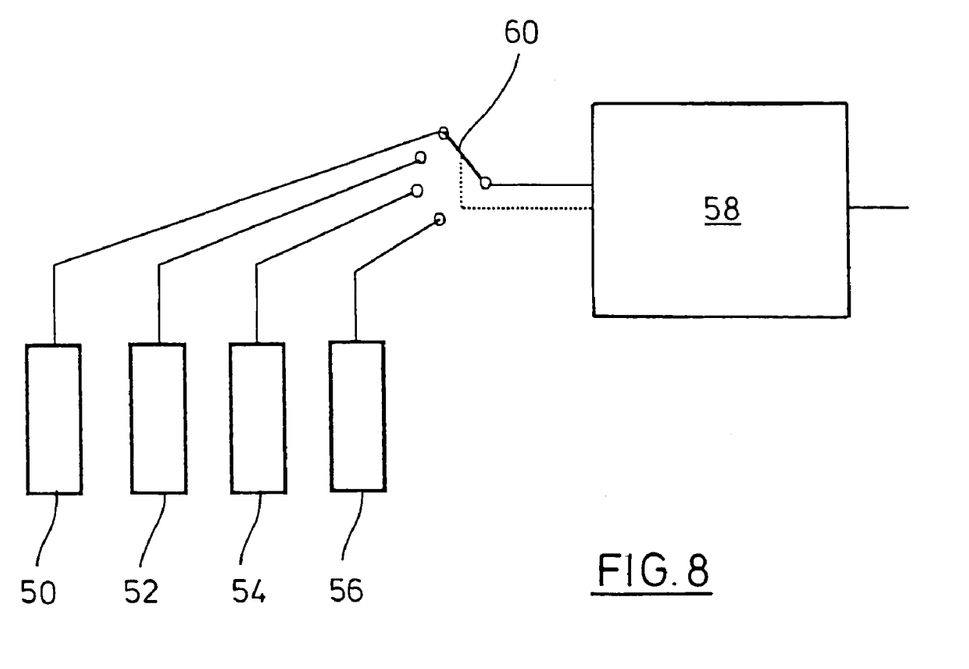
FIG. 8 shows multiple devices according to an embodiment of the invention with an interpretation electronics.
Figure 9:
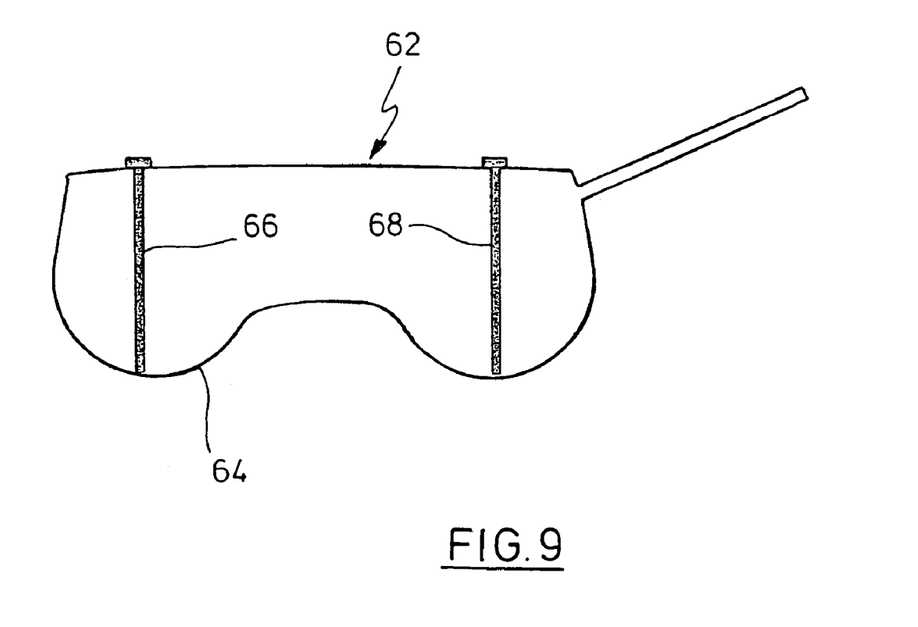
FIG. 9 shows the arrangement of two devices according to an embodiment of the invention in one automobile tank.

In FIG. 8, four resistor arrangements 50 to 56 are schematically represented, corresponding to the assembly according to FIGS. 1 and 2 or 3 to 7, respectively. They can be disposed at different places in a container. With the aid of an interpretation electronics 58, the individual resistor arrangements 50 to 56 can be consecutively read out individually, with the aid of a turning switch 60. The reading-out electronics is designed in a similar manner as has been shortly commented on in connection with FIG. 3. A plurality of such resistor arrangements or sensors for the determination of the level height may be advantageous, when a container 62 has a distinctly uneven bottom 64 (saddle tank), as is represented in FIG. 9. In the example of FIG. 9 two resistor arrangements 66, 68 or sensors are provided, by which a better determination of level height, and thus a volume determination in the container 62, can be carried out.

Figure 10:
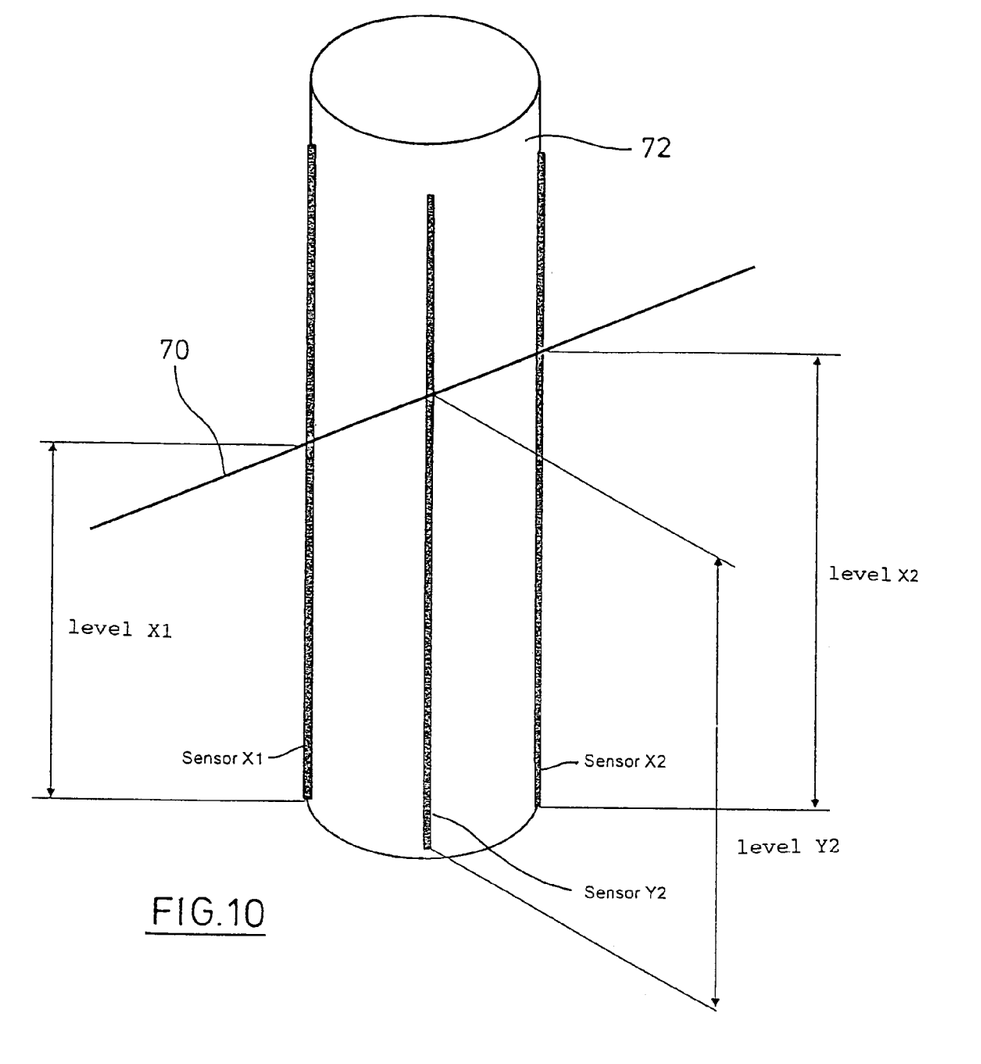
FIG. 10 shows the device according to an embodiment of the invention for inclination angle determination.
Figure 11:
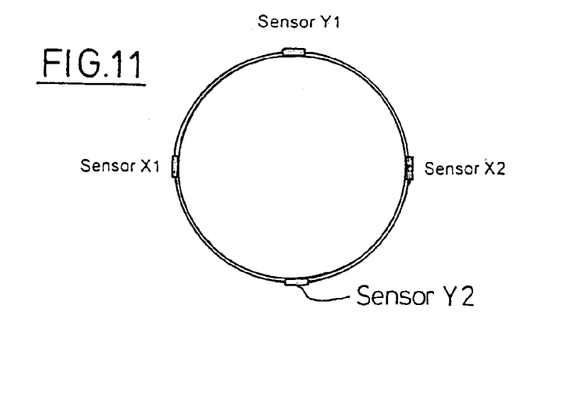
FIG. 11 shows the plan view of the arrangement of FIG. 10.

In the realisation example according to FIGS. 10 and 11, four level sensors X 1, X 2, Y 1, Y 2 are pairedly arranged on orthogonal axes. In their assembly, the mentioned sensors correspond to the resistor arrangements, such as the latter are described by means of the above figures. Therefore, it is possible to determine four levels X 1, X 2, Y 1, Y 2 with the four sensors. Thus, it is possible to determine the inclination of the liquid level in a container, too. In FIG. 10, the inclination is indicated by the full line 70.

The resistor sensors X 1, X 2, Y 1, Y 2 can be glued onto a support sheet, as described above. The sheet can be glued onto a support tube 72, as is represented in FIG. 10, through which results an uniform distribution on the perimeter of the support tube 72. When such a sensor is placed in the middle of the tank, an inclination-independent level height measurement is made possible by simply averaging the measured levels.

Figure 12:
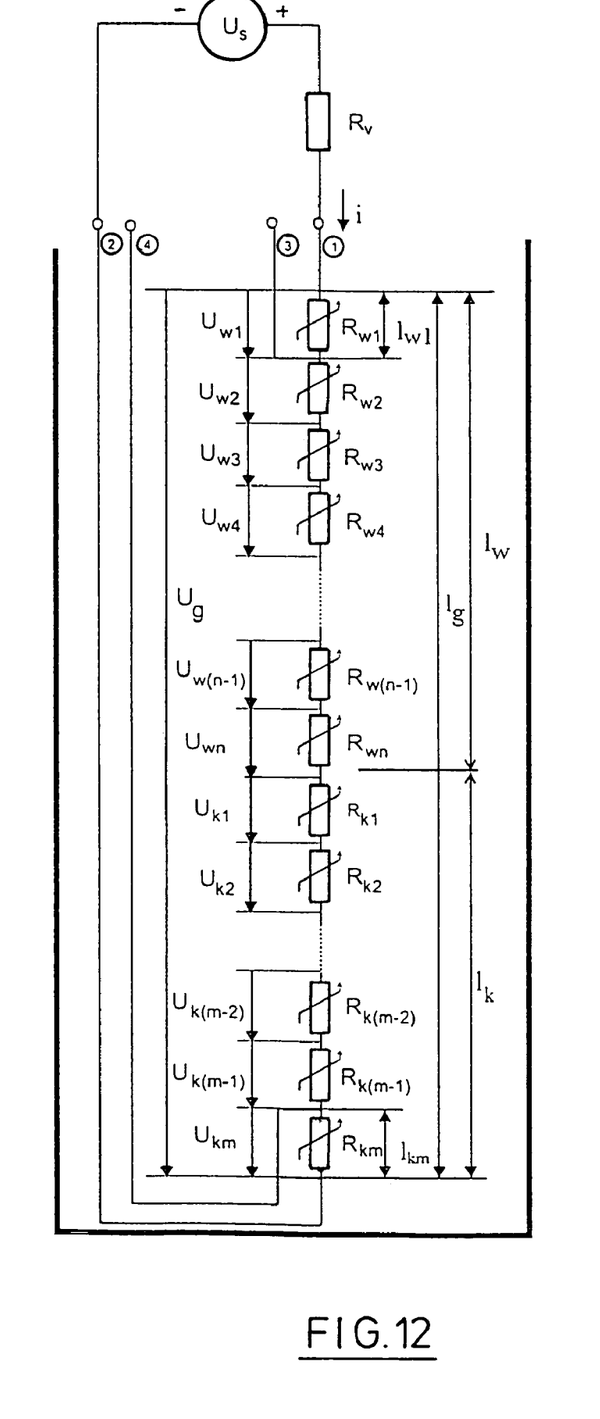
FIG. 12 shows, in the form of an electric circuitry diagram, a embodiment of the invention which is modified with respect to FIG. 1.

In the form of realisation according to FIG. 12, an upper reference resistor portion is constituted by a resistor element $R_{w1}$ with the length $L_{w1}$. An intermediate resistor portion is constituted by individual resistor elements $R_{w2}$ to $R_{k(m-1)}$. A lower resistor portion is constituted by the resistor element $R_{km}$ with the length $L_{km}$. The linear resistor arrangement itself is immersed into liquid across a height of $L_k$. The total length of the three resistor portions is $L_g$, so that the "dry" length is $L_N$. All the resistor elements are of equal length and have an equal distance from each other. Furthermore, they have an uniform resistance per unit length and are equal with respect to their resistance. On the points 2 and 4, the voltage which is present across the resistor $R_{km}$ can be measured. On the points 3 and 1, the voltage which is present across the resistor $R_{W1}$ is measured. The overall voltage across the complete resistor arrangement is $U_g$. It induces the current i. The total number of resistor elements is s, m is the number of the immersed into the liquid ones and n the number of those which are situated in the air. The voltage across the complete resistor arrangement or resistor chain is therefore $$U_g = \sum_1^n U_{wn} + \sum_1^m U_{km} = n \cdot U_{w1} + m \cdot U_{km}$$

By substituting n=s−m we obtain $$U_g = (s-m) \cdot U_{w1} + m \cdot U_{km} = s \cdot U_{w1} - m \cdot U_{1w} + m \cdot U_{km}$$

From this results $$m = \frac{U_g - s \cdot U_{w1}}{U_{km} - U_{w1}}$$

As indicated above, $U_w$ and $U_k$ can be easily measured. $U_g$ can be measured in a simple manner, too. Because m is the number of resistor elements which are immersed into the liquid, the immersed length results from m, since the length of the resistor elements and their distance from each other, respectively, are known. It is to be understood that the fineness of the measurement depends of the number and the length of the resistor elements.

Figure 13:
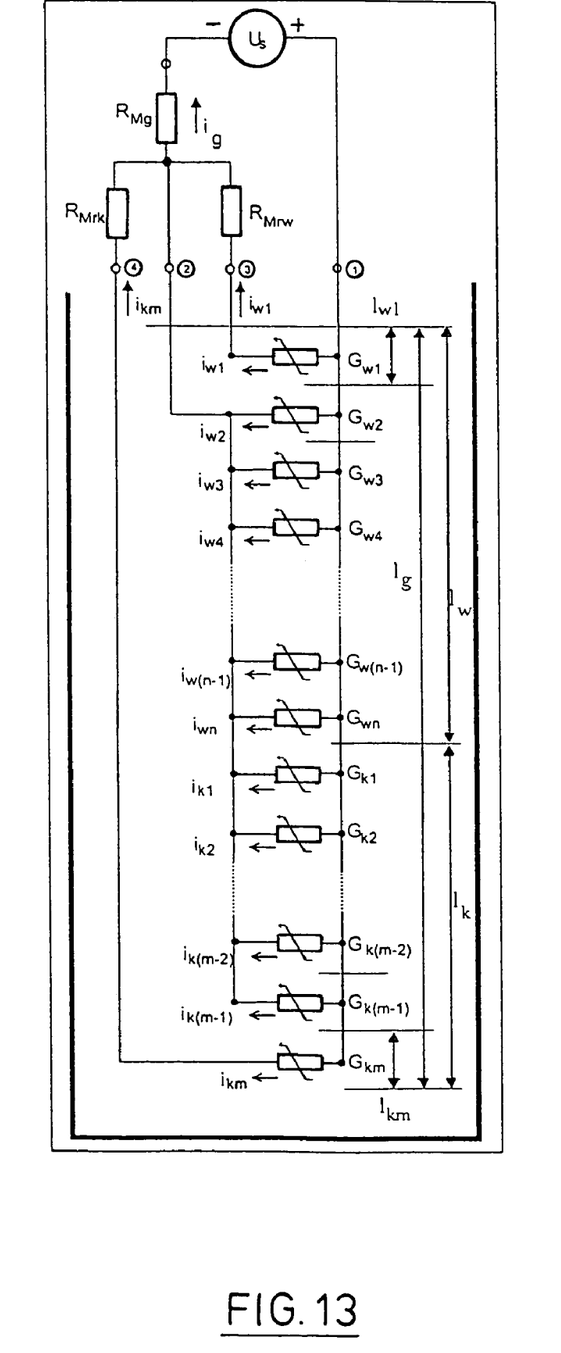
FIG. 13 shows a further embodiment of the invention in the form of an equivalent circuit diagram.

In the form of realisation according to FIG. 13, a plurality of resistor elements $G_{w1}$ to $G_{km}$ is provided. Because they are parallel connected, they are denoted by their conductivity. The upper resistor portion with the length $l_{w1}$ is constituted by the resistor element $G_{w1}$. The intermediate resistor portion is constituted by a plurality of parallel connected resistor elements $G_{w2}$ to $G_{k(m-1)}$. The lower resistor portion is constituted by the resistor element $G_{km}$. The each parallel connected resistor portions are connected with the voltage source $U_s$ via protective resistors $R_{mg}$, $R_{mrk}$ and $R_{mrw}$. The current $i_{w1}$ and $i_{km}$ through the upper and lower portion, respectively, is measured on the points 3 and 4. The total current is $i_g$, which is also measured. The resistor elements are of equal magnitude and have a predetermined distance from each other. The total length of the resistor arrangement is denoted with $l_g$ and the length which is immersed into the liquid with $l_k$, so that the residual length is $l_w$. Thus, the following equation results for the current ig:

$$ig = \sum_1^n i_{wn} + \sum_1^m i_{km} = n \cdot i_{w1} + m \cdot i_{km}$$

Since s=n+m is valid, according to the above demonstration, we obtain for the current $$i_g = s \cdot i_{w1} - n \cdot i_{w1} + m \cdot i_{km}$$

From this results the following formula for m, that is, for the number of resistors which are immersed into the liquid:

$$m = \frac{i_g - s \cdot i_{w1}}{i_{km} - i_{w1}}$$

Figure 14:
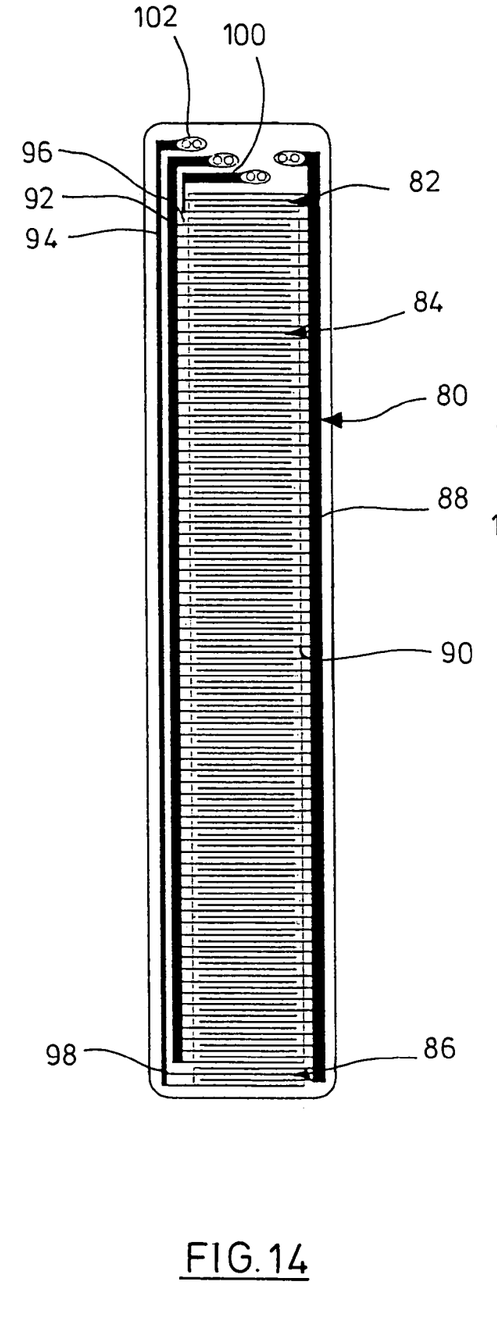
FIG. 14 shows a possible implementation of the embodiment according to FIG. 13.

In FIG. 14, an elongated support sheet 80 is shown, onto which are printed three resistor paths 82, 84 and 86. The resistor path 82 is of a short length, as well as the resistor path 86, whereas the resistor path 84 is relatively long. The resistor paths 82 to 86 are disposed linearly, thus vertically one upon the other, when the sheet is vertically immersed into liquid. On the right side of the mentioned resistor paths, a conductor path 88 is applied, to which conductor portions 90 are connected in equally spaced relationship, which extend perpendicular to the resistor path 88 in a finger-shaped fashion. On the opposite side, two conductor paths 92, 94 are applied onto the sheet 80. The conductor path 92 includes a series of finger-shaped conductor portions 96, which extend traversely in the direction of the other conductor path 88. The conductor path 94 has two conductor portions 98 on its lower end, which alternate with the conductor portions 90 of the conductor path 88 and are comb-like interlaced. A fourth conductor path 100 includes finger-shaped conductor portions which alternate with the conductor portions 90 of conductor path 82 and are therefore also comb-like intermeshing. The intermediate resistor portion is thus constituted by a plurality of parallel connected resistors, the conductor portions 90, 96 comb-like intermeshing and alternating with each other in doing so. Thus, FIG. 14 realises the equivalent circuit diagram according to FIG. 13. The connections 102 of the conductor paths 88, 92, 94 and 100 are connected in the same way, as this is represented in FIG. 13.

It should be mentioned that such a resistor arrangement is inherently known for the heating of automobile panes or -mirrors, but not in the arrangement of separated resistor portions where the intermediate resistor portion has a large length, whereas the upper and the lower resistor portion have a short length and serve as a reference.

Figure 15:
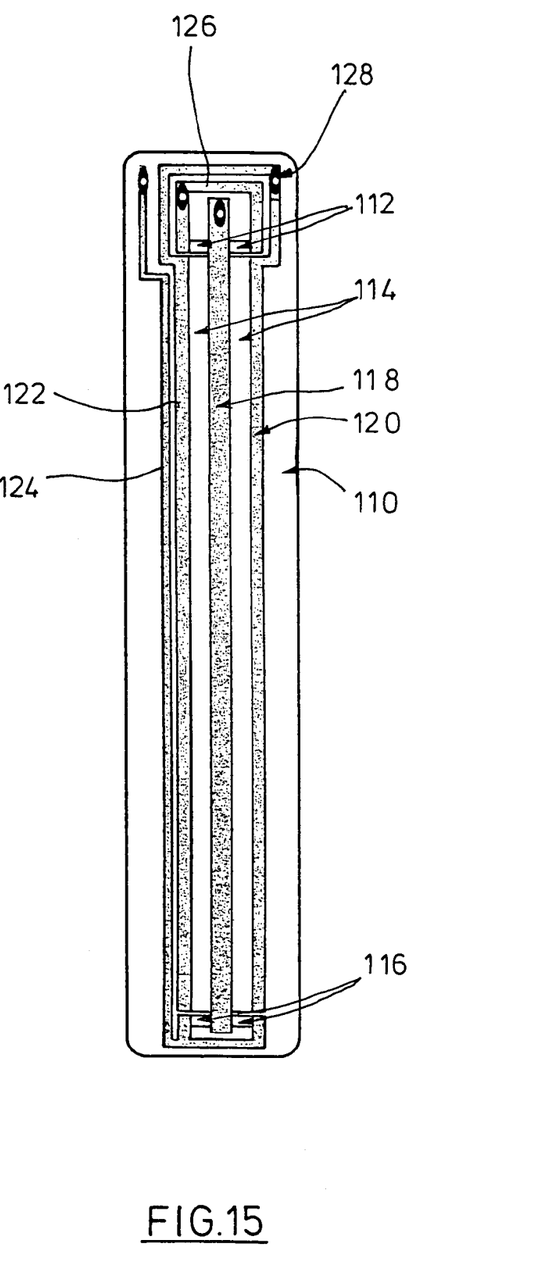
FIG. 15 shows a further possibility of implementation of the embodiment according to FIG. 13.

The form of realisation according to FIG. 15 represents an alternative to that one according to FIG. 14. Onto a sheet 110, three each continuous resistor paths are applied by the printing method. A first upper short resistor path 112 is followed by a long resistor path 114. The latter is followed by a short resistor path 116 again. An intermediate conductor path 118 extends centric-longitudinally through the mentioned resistor paths. The conductor path 118 corresponds to the conductor path 88 according to FIG. 14. Conductor paths 120 and 122, respectively, extend on both sides of the resistor path 114. They correspond to the conductor path 92 according to FIG. 14. A conductor path 124, parallel to the conductor path 122, serves for the connection to the resistor path 116. A further conductor path 126 serves for the connection to resistor path 112. The connection points 128 to the mentioned resistor paths are connected with the voltage source in the same manner as has been represented and described by means of FIG. 13. Thus, even this realisation form realises the equivalent circuit diagram according to FIG. 13, but with a continuous intermediate resistor portion instead of individual parallel connected resistor portions.

The length about which the resistor arrangement of FIG. 15 is immersed into the liquid results from $$l_k = \frac{l_{rr} \cdot i_g - l_g \cdot i_{wl}}{i_{km} - i_{wl}}$$

where $l_{rr}=l$ is the length of a reference resistor, when these have the same length $l_{w1}=l_{km}=l_{rr}$.

The invention claimed is:

1. A device for measuring at least one of a level and a temperature of a liquid in a container, said device comprising:
   a resistor arrangement adapted to be immersed in the liquid, an immersed length of the resistor arrangement in the liquid corresponding to the level of the liquid in said container;
   the resistor arrangement including upper, middle and lower temperature-dependent elongated resistor elements which are connected in parallel;
   each said resistor element having an uniform resistance per unit length along a length thereof;
   the upper and lower resistor elements being shorter than the middle resistor element;
   a power source having first and second terminals connected to said resistor arrangement;
   each of said resistor elements having opposite first and second ends, the first ends of said resistor elements being commonly connected to the first terminal of said power source, the second ends of said resistor elements being commonly connected to the second terminal of said power source;
   a current measuring unit for measuring currents flowing though the resistor elements; and
   a computer for calculating the immersed length of the resistor arrangement or the temperature of the liquid from predetermined lengths of the resistor elements and the measured currents.

2. The device of claim 1, wherein
   the first ends of said resistor elements are directly connected to the first terminal; and
   the second ends of said upper and lower resistor elements are connected to the second terminal via two auxiliary resistors, respectively.

3. The device of claim 1, wherein the middle resistor element includes a plurality of discrete resistor elements which are connected in parallel, have the same length, and are spaced at the same distance from each other.

4. The device of claim 3, wherein the upper and lower resistor elements are identical to each of the discrete resistor elements of the middle resistor element.

5. The device of claim 3, wherein each of the discrete resistor elements of the middle resistor element has first and second ends,
   the first ends of all said discrete resistor elements of the middle resistor element are directly connected to the first terminal; and
   the second ends of all said discrete resistor elements of the middle resistor element are directly connected to the second terminal.

6. The device of claim 1, wherein the resistor arrangement comprises
   a substrate;
   upper, middle and lower separate conductive tracks printed onto said substrate, wherein said conductive tracks define the resistor elements, respectively, have the same width, and are physically arranged at predetermined intervals in the recited order on said substrate; and
   conductors printed onto said substrate and electrically connecting said upper, middle and lower conductive tracks to respective terminals on said substrate.

7. The device of claim 6, wherein
   the conductors comprise first and second conductors;
   said first and second conductors extend along opposite sides of said middle conductive track, electrically connecting the middle conductive track to first and second terminals on the surface, respectively, and comprise each a plurality of conductive fingers;
   said fingers divide the middle conductive track into a number of resistor elements connected in parallel and define two interleaving comb patterns.

8. The device of claim 7, wherein
   the conductors further comprise third and fourth conductors;
   the third conductor extends along one of the opposite sides of said middle conductive track and electrically connects the lower conductive track to a third terminal on the substrate;
   the fourth conductor electrically connects the upper conductive track to a fourth terminal on the substrate; and
   the first conductors also electrically connects the upper and lower conductive tracks to the first terminal on the substrate.

9. The device of claim 6, wherein
   the conductors comprise a first conductor that is located within the conductive tracks and electrically connects all of the conductive tracks to a first terminal on the substrate.

10. The device of claim 9, wherein the conductors further comprise
    second and third conductors extending along opposite sides of said middle conductive track and commonly electrically connecting the middle conductive track to a second terminal on the surface;
    a fourth conductor extends along one of the opposite sides of said middle conductive track and electrically connects the lower conductive track to a third terminal on the substrate; and
    a fifth conductor electrically connects the upper conductive track to a fourth terminal on the substrate.

* * * * *